United States Patent [19]

Lawrance et al.

[11] 4,272,353

[45] Jun. 9, 1981

[54] METHOD OF MAKING SOLID POLYMER ELECTROLYTE CATALYTIC ELECTRODES AND ELECTRODES MADE THEREBY

[75] Inventors: Richard J. Lawrance, Hampstead, N.H.; Linda D. Wood, Andover, Mass.

[73] Assignee: General Electric Company, Wilmington, Mass.

[21] Appl. No.: 125,825

[22] Filed: Feb. 29, 1980

[51] Int. Cl.³ .................... C25B 11/00; C25B 13/08
[52] U.S. Cl. ................... 204/283; 204/282; 204/296
[58] Field of Search ............ 204/282, 283, 290 R, 204/290 F, 295, 296

[56] References Cited

U.S. PATENT DOCUMENTS

| | | | |
|---|---|---|---|
| 3,134,697 | 5/1964 | Niedrach | 429/30 |
| 3,297,484 | 1/1967 | Niedrach | 429/41 |
| 3,432,355 | 3/1969 | Niedrach et al. | 429/42 |
| 3,992,271 | 11/1976 | Danzig et al. | 204/129 |
| 4,039,409 | 8/1977 | LaConti et al. | 204/129 |
| 4,061,549 | 12/1977 | Hazelrigg et al. | 204/98 |
| 4,120,772 | 10/1978 | Kadisa | 204/252 |
| 4,130,473 | 12/1978 | Eddleman | 204/252 |
| 4,171,253 | 10/1979 | Nolan et al. | 204/195 S |

*Primary Examiner*—F. C. Edmundson
*Attorney, Agent, or Firm*—I. David Blumenfeld

[57] ABSTRACT

A method of making electrodes using a solid polymer electrolyte base member and catalyst is disclosed. Before the catalyst is deposited upon the surface of the solid polymer electrolyte, the surface is treated by a suitable abrading or roughening means which contacts the surface of the solid polymer electrolyte base member in at least two directions. In a preferred mode, the solid polymer electrolyte membrane is abraded with a silicon carbide sheet to provide the desired roughness. The catalyst is deposited upon the roughened or abraded surface and fixed thereto by suitable means, e.g., pressure and/or heat. By this method, substantially reduced loadings of catalysts are possible. Solid polymer electrolyte catalytic electrodes made by this method are superior to prior art electrodes having substantially higher catalytic loadings when used as anodes in water electrolysis.

11 Claims, 3 Drawing Figures

METHOD OF MAKING SOLID POLYMER ELECTROLYTE CATALYTIC ELECTRODES AND ELECTRODES MADE THEREBY

This invention relates to solid polymer electrolyte catalytic electrodes, and more particularly, it relates to improvements in the method of making solid polymer electrolyte catalytic electrodes and to the electrodes made thereby.

Solid polymer electrolyte catalytic electrodes are used in various devices and processes. For example, they are used in fuel cells, gas generating devices and processes, chemical synthesis devices, chemical treatment and processing devices and methods, gas dosimeters and sensing devices and the like.

Solid polymer electrolyte catalytic electrodes are currently manufactured by several techniques. U.S. Pat. No. 3,297,484 illustrates in detail materials for electrode structures including exemplary catalyst materials for electrodes, ion exchange resins for solid polymer electrolyte membranes and current collecting terminals. Catalytically active electrodes are prepared from finely-divided metal powders mixed with a binder, such as polytetrafluoroethylene resin, and the electrode comprises a bonded structure formed from a mixture of resin and metal bonded upon each of the two major surfaces of a solid polymer electrolyte solid matrix, sheet or membrane. In U.S. Pat. No. 3,297,484, the resin and metal or metal alloy powder mix is formed into an electrode structure by forming a film from an emulsion of the material, or alternatively, the mixture of resin binder and metal or metal alloy powder is mixed dry and shaped, pressed and sintered into a sheet which can be shaped or cut to be used as the electrode. The resin and metal powder mix may also be calendered, pressed, cast or otherwise formed into a sheet, or fibrous cloth or mat may be impregnated and surface coated with the mixture of binder and metal or metal alloy powder. In U.S. Pat. No. 3,297,484, the described electrodes are used in fuel cells. In U.S. Pat. No. 4,039,409, the bonded electrode structure made from a blend of catalyst and binder is used as the electrode in a gas generation apparatus and process.

In U.S. Pat. No. 3,134,697, many ways are described for incorporating catalytically active electrodes into the two major surfaces of an ion exchange resin membrane. In one embodiment, as explained above, the electrode material made of metal or metal alloy powder and a resin binder may be spread on the surface of an ion exchange membrane or on the press platens used to press the electrode material into the surface of the ion exchange membrane, and the assembly of the ion exchange membrane and the electrode or electrode materials is placed between the platens and subjected to sufficient pressure preferably at an elevated temperature sufficient to cause the resin in either the membrane or in admixture with the electrode material either to complete the polymerization if the resin is only partially polymerized, or to flow if the resin contains a thermoplastic binder.

In all of the foregoing techniques, it has been necessary to utilize liquid-based emulsion and several processing steps to form film of the electrode material and thereafter bind or press the sheet of electrode material upon the solid polymer electrolyte membrane, or it has been necessary to use binders and substantial quantities of expensive catalyst materials to prepare solid polymer electrolyte catalytic electrodes. It has also been necessary to utilize large loadings of catalyst to make acceptable electrodes in these prior art methods.

It is the principal object of this invention to provide an improved method of making solid polymer electrolyte catalytic electrodes and to provide the catalytic electrodes made thereby.

It is another object of this invention to reduce the amount of catalyst normally required for making solid polymer electrolyte catalytic electrodes.

It is another object of this invention to provide solid polymer electrolyte catalytic electrodes having substantially less catalyst electrode material bonded to the surface.

It is another object of this invention to provide a method of making solid polymer electrolyte catalytic electrodes by a dry process.

The various objects and advantages of this invention are realized by providing a method of applying catalyst to a solid polymer electrolyte comprising:

(a) roughening the surface of the solid polymer electrolyte;

(b) depositing catalyst particles upon the roughened surface; and (c) fixing the particles upon the roughened surface In accordance with the present invention, before the catalyst is deposited upon the surface of the solid polymer electrolyte, the surface is subjected to a suitable abrading or roughening means, preferably in at least two directions to form a crosshatched pattern in the solid polymer electrolyte surface.

The electrode made in accordance with the present invention, comprises a solid polymer electrolyte membrane base member having at least one abraded or roughened surface and finely-divided conductive catalytic particles fixed upon the abraded or roughened surface. In the preferred embodiment of the present invention, the electrode comprises a solid polymer electrolyte membrane base member wherein the surface of the membrane base member is abraded or roughened in at least two directions to form a crosshatched pattern.

Critical in the method of making the solid polymer electrolyte catalytic electrodes in accordance with the present invention is the roughening or abrading of the surface of the solid polymer electrolyte membrane base member. It is not sufficient that a pattern or design be placed in the surface of the solid polymer electrolyte by embossing, stamping, pressing, or otherwise forming a design or pattern therein during the manufacture, molding, processing or extruding of the membrane. The surface of the solid polymer electrolyte membrane must be roughened by frictional or impinging abrasives or roughening agents, preferably in at least two directions to form a crosshatched pattern. The abraded or roughened surface of the solid polymer electrolyte membrane appears to provide a support for locking, uniting, or fixing the finely-divided catalyst particles to the surface of the solid polymer electrolyte membrane.

In accordance with the present invention, it was unexpectedly found that the surface of a solid polymer electrolyte membrane could be physically roughened or abraded without sacrificing the integrity of the membrane structure. Furthermore, it was unexpectedly discovered that by the process of the present invention, it is possible to achieve loading of the catalyst upon the solid polymer electrolyte membrane surface in substantially lower amounts than the methods of the prior art.

By prior art techniques, it has been impossible to prepare solid polymer electrolyte catalytic electrodes having loadings as low as 0.25 mg per cm$^2$ or even lower with no compromise in the integrity of the solid polymer electrolyte catalytic electrode or the performance of the solid polymer electrolyte catalytic electrode in various gas generating and other devices. In certain cases, the solid polymer electrolyte catalytic electrodes prepared in accordance with the present invention and having only 0.25 mg/cm$^2$ catalyst upon one surface of the membrane showed a 50 millivolt improvement over cells using solid polymer electrolyte catalytic electrodes having 4 mg/cm$^2$ catalyst loaded upon the solid polymer electrolyte membrane. Thus, with one-sixteenth the amount of catalyst upon the solid polymer electrolyte membrane, equal or better voltages have been obtained when solid polymer electrolyte catalytic electrodes made in accordance with the present invention are used in electrolysis cells for the generation of oxygen gas.

As used herein, the term "crosshatched" means marked with a series of lines, grooves, valleys, striations, or serrations and the like that cross at right angles or obliquely. As used herein, roughening or roughened and abrading or abraded may be used interchangeably and are defined as any physical or chemical act which prepares the surface of the solid polymer electrolyte membrane for the reception of the finely-divided catalyst and which promotes the ability of the catalyst to adhere, unite or bond to the solid polymer electrolyte surface after the catalyst is fixed thereto.

For a more complete understanding of the solid polymer electrolyte electrodes of the present invention, reference is made to the following description taken in conjunction with the accompanying photographs in which.

Figure 1:
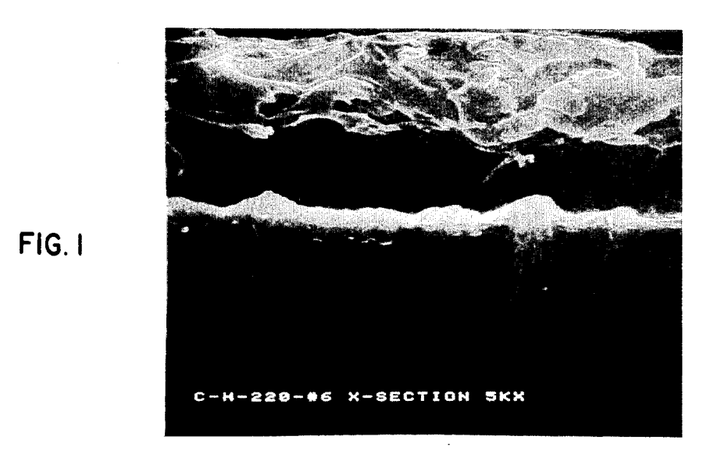
FIG. 1 is a scanning electron micrograph of the cross section of a solid polymer electrolyte membrane roughened in accordance with the present invention.
Figure 2:
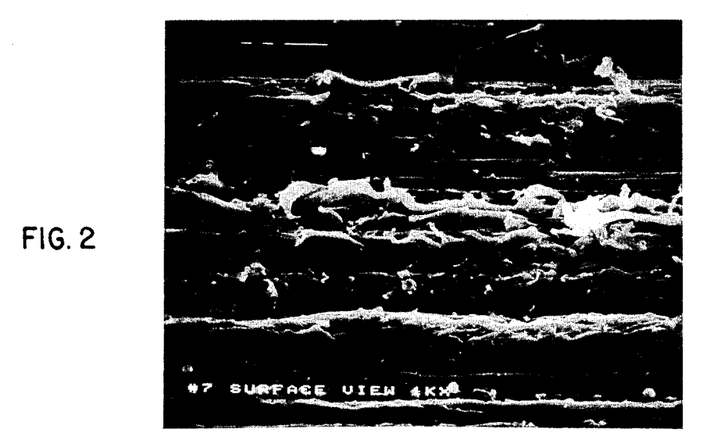
FIG. 2 is a scanning electron micrograph of a surface view of a solid polymer electrolyte membrane roughened in accordance with the present invention.
Figure 3:
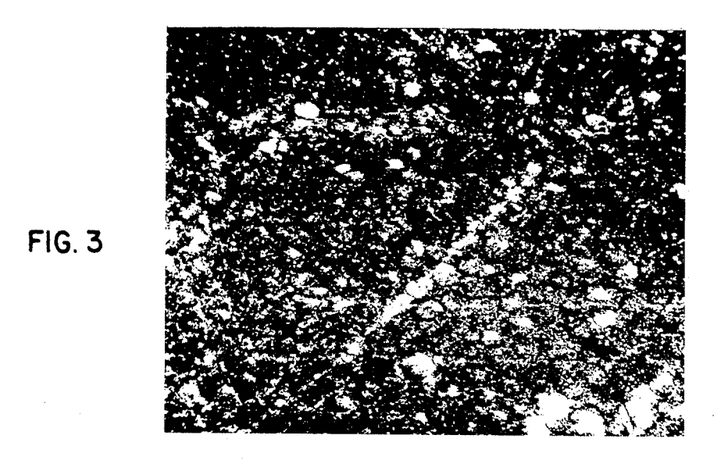
FIG. 3 is a scanning electron micrograph of a surface view of a solid polymer electrolyte catalytic electrode made in accordance with the present invention.

The photograph in FIG. 1 is a scanning electron micrograph having a magnification of 5,000 X, the photograph in FIG. 2 is a scanning electron micrograph having a magnification of 1,000 X, and the photograph in FIG. 3 is a scanning electron micrograph having a magnification of 50 X. The scanning electron micrographs show the roughened surface areas of the solid polymer electrolyte membranes in FIGS. 1 and 2 and the roughened surface area of the solid polymer electrolyte catalytic electrodes in FIG. 3 which have been roughened or abraded in accordance with the present invention. In FIG. 1, the depressions or valleys have a depth of about 7 microns. In FIG. 1, there are two ridges or crests in the solid polymer electrolyte membrane and one valley or groove between the two ridges or crests. In FIGS. 1 and 2, the pattern in the surface of the solid polymer electrolyte membranes was made by sanding the solid polymer electrolyte membrane with 220 grit silicon carbide mounted upon a roller and rotating 1,200 revolutions per minute. The pattern formed in the electrode of FIGS. 1 and 2 was made by passing the solid polymer electrolyte membrane through the sanding device four times, two times of which the sanding was carried out at an angle 90 degrees to that of the first two passes. The scanning electron micrographs illustrate the roughness in the surface of the solid polymer electrolyte membrane which can be obtained by multiple passes through a sanding machine without damage to the structural integrity of the membrane. FIG. 3 shows, at a magnification of 50 X, catalytic material deposited upon the surface of the solid polymer electrolyte membrane at a loading of 0.25 mg/cm$^2$ iridium finely-divided metal powder. In FIG. 3, darkened areas generally represent solid polymer electrolyte and lighter areas which appear to be gray or white, generally represent catalytic material (metal, metal alloy or metal oxide and the like).

As indicated above, the reduction of catalyst material loadings without subsequent loss of performance is the result of the specified roughening or abrading of the surface of the solid polymer electrolyte membrane prior to loading or placing the catalyst material upon the membrane surface and thereafter fixing the catalytic material to the membrane surface. In accordance with the present invention, it has been found that it is possible to subject the surface of the solid polymer electrolyte membrane to multiple passes through a sanding machine, to multiple grit blastings or to any other type of multiple roughening, rubbing or abrading techniques without damaging the solid polymer electrolyte membrane which may be as thin as 10 mils or even less.

The solid polymer electrolyte matrices, membranes or sheets which make up the base member of the electrodes of the present invention, and the surface of which is roughened or abraded in accordance with the present invention, are well known in the art and are not critical in the practice of the present invention. Typical solid polymer electrolyte membranes are described in U.S. Pat. No. 4,171,253 and U.S. Pat. No. 3,134,697. The solid polymer electrolyte membranes or sheets are ion exchange resin membranes, and the resins include in their polymeric structure ionizable radicals, one ionic component of which is fixed or retained by the polymeric matrix with at least one ion component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. Two broad classes of ion exchange resins are the so-celled sulfonic acid cation exchange resins and carboxylic cation exchange resins. In the sulfonic acid membranes, the cation ion exchange groups are hydrated sulfonic acid radicals which are attached to the polymer backbone by sulfonation. In the carboxylic resins, the ion exchanging group is —COOH. The ion exchange resins may also be in various salt forms such as the sodium salt and the potassium salt.

In the case of anion exchange resins the ionic group is basic in nature and may comprise amine groups, quaternary ammonium hydroxides, the guanidine group, and other nitrogen-containing basic groups. In both cases, that is, in those where the ionic groups are acidic groups or in those cases where the ionic groups are basic, the ionizable group is attached to a polymeric compound, typical examples of which are a phenolformaldehyde resin, a polystyrene-divinyl-benzene copolymer, a urea-formaldehyde resin, a melamine-formaldehyde resin, and the like. The formation of these ion exchange resins into membranes or sheets is also well known in the art, and they are generally known as the heterogeneous type in which granules of ion exchange resin are incorporated into a sheet-like matrix of suitable binder, for example, a binder of polyethylene or polyvinyl chloride, and the continuous or homogeneous ion exchange resin membrane in which the entire membrane structure has ion exchange characteristics. These membranes are commercially available, and a typical example of a commercial sulfonated perfluorocarbon membrane is sold by E. I. Dupont de Nemours & Co. under the trade designation NAFION. A preferred cation polymer membrane (solid polymer electrolyte membrane) is one in which the polymer is a hydrated co-polymer of polytetrafluoroethylene (PTFE) and polysulfonyl fluoride vinyl ether containing pendant sulfonic ($SO_3$) acid groups. The sulfonic groups are chemically bound to the perfluorocarbon backbone, and the membrane is hydrated by soaking it in water, preferably at elevated temperatures for 10–60 minutes which yields a membrane having 30% to 40% water based upon dry weight of membrane.

In accordance with the present invention, it is generally preferred to hydrate, or alternatively expressed, submit the ion exchange membrane or the solid polymer electrolyte membrane to hydrolysis, after the solid polymer electrolyte membrane or sheet has been roughened or abraded, loaded with catalyst and fixed. Although the solid polymer electrolyte membrane may be hydrated prior to the roughening or abrading step, it is preferred that the hydrolysis thereof be carried out subsequent to the roughening or abrading to prevent complications during the roughening or abrading process. For example, it may be more difficult to abrade or roughen the surface of the solid polymer electrolyte membrane in the presence of the water of hydration because the abrading or roughening elements, for example, the grit, may become prematurely gummed or inoperable during the roughening or abrading step, thereby diminishing the life of the abrading or roughening agents and devices. It is for this reason that dry or substantially dry solid polymer electrolyte membranes with less than 15% water are recommended in the roughening or abrading step.

The membranes of this invention must have at least one roughened or abraded surface, and the roughening or abrading of the solid polymer electrolyte membrane surface may be carried out by any method which produces a crosshatched pattern, or a pattern equivalent thereto, in the surface of the membrane or sheet. Generally, the most efficient means for producing the necessary roughness or abrasion of the surface of the solid polymer electrolyte is by subjecting the membrane or sheet to a roughening or abrading agent or device in at least two directions. In an alternative embodiment, certain types of chemical etchings, for example, Tetraetch, with a strong caustic suspension, may be used to produce the roughness. Tetraetch is a trademark of W. Giore, Inc., Newark, Del. In the most preferred embodiments of the present invention, the solid polymer electrolyte membrane is subjected to multiple passes with frictional abrasives, preferably in two or more directions other than 180°. This type of frictional treatment produces a crosshatched pattern.

Typical of the roughening and abrasive agents and devices which may be used in accordance with the present invention, are sanding or other frictional treatment with an abrasive material deposited upon a substrate such as paper, cloth, fibers, combinations of the foregoing, and the like. Abrasive material such as aluminum oxide, silicon carbide, flint, emery, garnet and other natural minerals are adhesively bonded to a substrate. Frictional treatment may also be obtained by various scuffing, scratching, scraping, rasping, filing, grinding or any similar rubbing or abrading techniques. The solid polymer electrolyte membrane to be roughened is subjected to any of the foregoing frictional abrasives to roughen the surface of the membrane or the sheet. Manual or automatic means may be used to carry out the roughening or abrasion of the surface of the solid polymer electrolyte. Furthermore, a single surface of the solid polymer electrolyte membrane may be roughened in accordance with the present invention, or both surfaces of the solid polymer electrolyte membrane may be roughened in accordance with the present invention. When both surfaces of the solid polymer electrolyte membrane are roughened, they may be roughened simultaneously, as by simultaneously sanding both sides of the solid polymer electrolyte membrane, or one surface may be roughened prior to roughening of the second surface. When the surface of the solid polymer electrolyte membrane is roughened by the foregoing sanding techniques, it is preferred to sand the surface of the membrane in one direction and then sand the surface of the membrane in at least one other direction (except 180°). In the most preferred embodiments of the present invention, the solid polymer electrolyte membrane surface is subjected to at least four separate passes through an automatic sanding device.

Automatic sanding of solid polymer electrolyte membranes has been carried out by rolls of coated abrasive paper in a Curtain-Hebert Co., Inc. 710 series sanding machine wherein the abrasive is wrapped spirally around a cylinder and clamped thereon. The automatic sanding machine has a dynamically balanced cylinder to which the coated abrasive is applied, and a pressure roll in respect to the balanced cylinder is controlled by micrometer handwheels appropriately graduated.

The surface of the solid polymer electrolyte membrane may also be abraded or roughened by grit blasting of the surface. In a preferred embodiment, the grit blasting is carried out at various angles relative to the surface of the membrane or sheet to produce a roughened surface equivalent to the crosshatched surface produced from sanding techniques. Although the grit size of the abrasive and roughening agents is not critical, caution must be exercised in choosing an appropriate grit size so that the structural integrity of the solid polymer electrolyte membrane is not destroyed, that is, so that the solid polymer electrolyte membrane is not shredded or mutilated to the extent that passageways or ruptures are created through the membrane which thereby permit the physical migration of liquids or gases therethrough. Generally, typical grit sizes range from about 150 to about 600. In preferred embodiments, the abrasive material is generally from about 300–500 grit size.

Although it is critical in accordance with the present invention to provide a roughened or abraded surface, the depth of the channels, grooves, pits, notches, valleys, or any other irregulatities is not critical as long as there is sufficient roughness to promote the fixing of dry finely-divided or powdered catalytic material thereto. Typically it has been found that the mean or average depth of the roughness, that is, the grooves, valleys, notches, or other irregularities caused by the roughening or abrasive agents is from about 4 to about 10 microns depending upon the thickness of the solid polymer electrolyte membrane. In the preferred embodiment, the average or mean depth of the channels, grooves, valleys or other irregularities in the cross-hatched pattern upon the surface is about $6\pm2$ microns.

As used herein, the term "in two directions" to describe the abrasion or roughening of the surface means that there must be an abrasive or equivalent treatment of the surface in a first direction and at least one other treatment of the same surface to an abrasive or equivalent treatment at an angle other than 0° or other than 180°. In preferred embodiments, the angle of the other direction is about 90° to the first direction.

Once the surface or surfaces of the solid polymer electrolyte membrane base member have been roughened or abraded in accordance with the present invention, catalytic particles or powder is deposited upon the surface of surfaces and fixed thereto. Catalysts for catalytic sensing electrodes, for fuel cell electrodes, for chemical synthesis and processing electrodes, for gas generation electrodes and the like are well known in the art and are not critical in the practice of the present invention. One skilled in the art can choose any suitable catalyst material or materials depending upon the end use of the solid polymer electrolyte catalytic electrode. Many catalysts are described in U.S. Pat. Nos. 3,297,484 and 3,369,886 and include metals, metal oxides, metal alloys and other metal compounds, including mixtures of the foregoing selected from the group consisting of metals in groups IV-B, V-B, VI-B, VII-B, VIII, I-B, II-B, III-B, IV-A and V-A of the Periodic Chart of the Elements. Typical examples of the metals, metal oxides, metal alloys and other metal compounds which may be used in accordance with the present invention, and mixtures of the foregoing, include the metals, metal oxides, metal alloys and other metal compounds of titanium, zirconium, vanadium, niobium, chromium, molybdenum, tungsten, manganese, rhenium, ruthenium, osmium, cobalt, rhodium, iridium, nickel, palladium, platinum, copper, silver, gold, zinc, cadmium, yttrium, tin, lead, and the like.

The catalyst materials are deposited or placed upon the surface of a roughened or abraded membrane in the form of finely-divided particles or powders. The metal, metal oxide, metal alloy and other metal compounds and the like, and mixtures thereof, are well known in the art in their finely-divided or powdered forms. One typical method of making the finely-divided metals and metal alloys is described in U.S. Pat. No. 3,369,886 where salts of the desired finely-divided metals are dissolved in a suitable solvent, and an aluminum compound is then added to the solution. After the addition of the aluminum compound, such as an aluminate salt, a reducing agent such as formaldehyde, hydrazine, hydroxylamine, methanol, hydrogen, propanol, acetaldehyde, and the like, is added under conditions so that the reduction of the metals and precipitation of the aluminum hydroxide occur simultaneously. The precipitate is treated with a basic solution and then dried. Another method of making a finely divided metal alloy comprises mixing in aqueous solution, the water-soluble salts of at least two metals, and a first reducing agent in an amount and under conditions insufficient to reduce the metal salts in solution; adding the aqueous solution of metal salts containing the first reducing agent to a caustic solution of a second reducing agent present in an amount and under conditions sufficient to cause the reduction of the dissolved metal salts at elevated temperatures, whereby a precipitate of alloy of the metals in the metal salts forms in the solution; and separating the precipitate from the solution. Still another method for producing finely-divided metals, metal alloys, and metal oxides which are useful in the present invention, is known as the Adams process or modified Adams process and is described in U.S. Pat. Nos. 3,297,484 and 4,039,409 and essentially embraces thermally decomposing mixed metal salts. For example, a thermally decomposable ruthenium halide, such as ruthenium chloride, is added to an appropriate quantity of chloroplatinic acid in the same weight ratio desired in the final alloy. An excess of sodium nitrate is incorporated, and the mixture is fused in a silica dish at 500° C. for three hours. The residue is washed thoroughly to remove soluble nitrates and halide salts leaving a platinum-ruthenium oxide. The resulting suspension of mixed oxides may then be reduced at room temperature by bubbling hydrogen therethrough or by using an electrochemical reduction technique, i.e., electrochemical reduction in acid media. The product, which is a reduced platinum-ruthenium alloy, is dried thoroughly as by the use of a heat lamp, then ground, comminuted or pulverized and is then sieved through a suitable screen.

Although particle size of the powder or finely-divided catalytic material used in the solid polymer electrolyte catalytic electrode of the present invention is not critical, a preferred range of particle size is from about 25 to about 1000 Angstrom units. In another preferred embodiment, the finely-divided catalytic particles are those which are sieved through sieves having a size from about 50 mesh to about 80 mesh.

Since the catalytic particles upon the surface of the solid polymer electrolyte membrane must be energized for the passage of current for the electro oxidation or electro reduction of chemicals and elements, for the passage of current through the solid polymer electrolyte membrane, and the like, the catalyst particles or powder must be of the type generally classified as conductive, that is, such catalyst particles or powder must be electrically conductive in accordance with the present invention.

As used herein, finely-divided means any powder form, particulate form, granular form, bead form, or any other form of catalyst material which may be deposited upon a roughened or abraded surface of a solid polymer electrolyte membrane and fixed thereto.

The amount of catalyst material which is deposited upon the surface of the solid polymer electrolyte membranes in accordance with the process of the present invention is not critical. However, it has been found in accordance with the present invention that the process of the present invention permits the deposition of surprisingly small quantities of catalyst material upon the surface of the membrane. In fact, it has heretofore been impossible to form solid polymer electrolyte catalytic electrodes with less than about 2.0 mg./cm.$^2$ upon the surface of a solid polymer electrolyte membrane. However, in accordance with the process of the present invention, it is now possible to prepare solid polymer electrolyte catalytic electrodes having 0.26 mg./cm.$^2$ catalyst or even less upon the surface of the membrane. In accordance with the present invention, catalyst particles may be deposited upon the surface of a solid polymer electrolyte membrane having a roughened or abraded surface in a range from about 0.08 mg. catalyst/cm$^2$ up to about 3.0 mg/cm$^2$ and higher. However, at higher loadings, that is loadings of catalyst over about 2 mg/cm$^2$, it may be necessary to add a binder such as Teflon, to cause better adhesion or fixing of the catalyst material upon the roughened or abraded surface. However, in accordance with the present invention, binders are optional and are not required for structural integrity at loadings of catalyst of about 2.0 mg/cm$^2$ or less.

Catalyst is added to the surface of the roughened or abraded solid polymer electrolyte membrane in the dry or free-flowing form. The area of the solid polymer electrolyte membrane, which may be the entire area or only a select portion of the surface of the membrane, is covered with the catalytic material. The exact amount of catalyst may be placed upon the surface of the membrane, that is, the desired loading, or an excess of the catalyst may be deposited or placed upon the roughened or abraded surface of the membrane, and appropriate steps may be taken to remove the excess catalyst material, such as by vibration, electrostatics, shaking, pouring, brushing, vacuum, and the like. The catalyst may also be deposited upon the abraded or roughened surface of the solid polymer electrolyte membrane by any suitable technique including spreading it with a knife or blade, brushing, pouring, dusting, electrostatics, vibrating and the like. Areas upon the surface of the membrane which require no catalyst material, can be masked, or other means can be taken to prevent the deposition of the catalyst material upon such areas. As indicated above, any amount of catalyst material can be left upon the roughened or abraded surface of the solid polymer electrolyte membrane depending upon the desired loading. The desired loading of catalyst upon the abraded or roughened membrane can be predetermined, and the specific amount of catalyst material can be deposited upon the surface of the membrane so that no excess catalyst is required. For example, if 0.25 mg/cm$^2$ catalyst is desired upon the roughened or abraded surface, that specific amount of catalyst material can be deposited upon the roughened or abraded surface and fixed thereon. In this manner, any waste of relatively expensive catalyst materials can be avoided.

The catalytic particles must be fixed upon the abraded or roughened surface or surfaces of the solid polymer electrolyte membrane base member. Any well known fixing technique of adhering, bonding or otherwise uniting a particulate or powdered material to a surface may be used in accordance with the present invention. Particles or powder may be fixed upon the roughened or abraded surface of the solid polymer electrolyte membrane by any one or a combination of pressure, heat, adhesive, binder, solvent, electrostatic, and the like. The preferred embodiment for fixing the particles of catalyst upon the surface of the solid polymer electrolyte membrane base member are by pressure, by heat or by a combination of pressure and heat.

When pressure is used to fix the catalyst particles upon the roughened or abraded surface of the solid polymer electrolyte, pressure from about 100 lbs/in.$^2$ to about 2,000 lbs/in$^2$ may be used. The most preferred pressure range is about 400–980 lbs/in$^2$ when used in conjunction with heat at about 140° C. to about 204° C. (about 300° F. to about 400° F.). Pressure and heat may be adjusted by one skilled in the art when a binder, such as Teflon, is used in admixture with the catalyst particles or powder.

When heat is used to fix the particles or powder upon the roughened or abraded surface of the solid polymer electrolyte membrane base member, temperatures of about 80° C. (180° F.) up to less than the decomposition temperature of the membrane are preferred. One preferred temperature range is from about 82° C. to about 238° C. (about 180° F. to about 460° F.), and the most preferred temperature range is from about 149° C. to about 204° C. (about 300° F. to about 400° F.). Pressure may be carried out by manual presses, flat plate presses, a roller or rollers pressing against a flat plate backup member or a roller or rollers pressing against a backup roller or rollers or by any suitable means of applying pressure, manually or automatically. Elevated temperatures suitable for fixing the particles upon the roughened or abraded surface may be achieved by heating the membrane having catalyst particles upon the roughened or abraded surface in an oven or other suitable heating device, by heating a pressure plate or plates, by heating a pressure roll or rollers, by external heat lamps, or by any other suitable heating devices or combination of the foregoing. When pressure and heat are applied simultaneously, the heating device may be incorporated in the pressure device such as the pressure plate or the pressure roller or rollers, or there may be any suitable combination of external sources of heat used in conjunction with pressure devices.

Generally the length of time for the application of heat is not critical and is dependent upon the temperature and/or pressure being applied to the surface of the solid polymer electrolyte membrane having catalyst particles or powder deposited thereon. Typically, heat is applied from less than about 1 minute to about 2 hours, and when a pressure of about 400–980 lbs/in$^2$. is used with a temperature of about 149° C. to about 204° C. (about 200° F. to about 400° F.), heat is applied for less than about 1 minute to about 15 minutes.

In preferred embodiments, any pressure plate or roller surfaces used to fix the particles of catalyst materials upon the roughened or abraded surfaces of the solid polymer electrolyte membranes, may have a release surface, such as a coating of Teflon, fluorocarbon or other suitable release material thereon.

Optional steps in the method of making the electrodes in accordance with the present invention, further include treating the solid polymer electrolyte membrane to attach or exchange active groups to the solid polymer electrolyte materials, i.e., the ion exchange resin, after the catalyst particles have been fixed on the roughened or abraded surface of the solid polymer electrolyte. For example, if the ion exchange resin in the solid polymer electrolyte membrane is in the potassium ($-SO_3K^+$) form, it may be exchanged by appropriate treatment well known to those skilled in the art for the hydrogen ($H^+$) form to insure that the ion exchange resin in the solid polymer electrolyte membrane is in the $-SO_3H^+$ form or any other desirable form. For example, it may be desirable to have the ion exchange resin in the sodium ($Na^+$) form or in any other desirable form. As explained above, the ion exchange resin may be a cation exchange resin or an anion exchange resin depending upon the particular application for the electrode made in accordance with the present invention.

Optionally, it may also be advantageous to hydrate or hydrolyze or otherwise treat the ion exchange resin membrane element of the electrodes made in accordance with the present invention after the catalyst particles or powder have been fixed to the roughened or abraded surface. Hydrolysis of these membranes may be carried out by soaking the membranes in water, preferably at elevated temperatures for a period of time, such as 100° C. for 30 minutes. This yields a membrane having 30% to 40% water based upon the dry weight of the membrane. The water content remains invariant providing the membrane is not allowed to dry out. Typically, hydrolysis of the electrode (ion exchange resin in the solid polymer electrolyte) is preferred in those cases wherein the electrode is used for water electrolysis (oxygen and hydrogen gas generation), fuel cell operation, gas sensing and dosimeter devices, chlorine gas and other chemical production, and the like. One skilled in the art can hydrolyze the solid polymer electrolyte catalytic electrodes made in accordance with the present invention depending upon the end used designed for the electrode. The optional ion exchanging step or steps and the optional hydrolysis steps or any other post-treatment of the solid polymer electrolyte catalytic electrode made in accordance with the present invention can be carried out immediately after fixing the catalyst particles or powder to the roughened or abraded surface or surfaces of the membrane or any time thereafter.

Although it had been believed that low loadings, such as less than 2.0 mg/cm$^2$, e.g., 0.25 mg/cm$^2$, would be useful in various applications using solid polymer electrolyte catalytic electrodes, such loadings were impossible to achieve by the prior art techniques. Excellent results have been obtained using the solid polymer electrolyte catalytic electrodes made in accordance with the present invention and having substantially lower loadings of catalyst material than the prior art electrodes. Low voltages equal to or better than the voltages attainable with the prior art electrodes have been achieved by the electrodes of the present invention.

In the case of water electrolysis using the solid polymer electrolyte catalytic electrodes made in accordance with the present invention, no conductivity agents are needed for the water electrolysis because the electrodes (catalyst particles) are united intimately with the surface of the solid polymer electrolyte. Thus, when the solid polymer electrolyte catalytic electrodes of the present invention are used for water electrolysis, water of high electrical resistance can be used for the water electrolysis. The electrolysis takes place at the interface of the solid polymer electrolyte and the electrode and because of this, it is possible to operate the water electrolysis apparatus when as low as 0.25 mg/cm$^2$ catalyst is loaded upon the surface of the solid polymer electrolyte membrane to achieve performance equal to or even better than prior art water electrolysis processes. Heretofore, loadings of 4.0 mg/cm$^2$ catalyst were not uncommon for catalyst loadings. With catalyst loadings of about 1/16 the amount, equal or better voltages have been obtained in water electrolysis cells for oxygen gas generation with the improved catalytic electrodes of the invention.

The following examples are presented for purposes of illustration only, and the details therein should not be construed as limitations upon the true scope of the invention as set forth in the claims.

EXAMPLE 1

A sample of dry solid polymer electrolyte membrane supplied by E. I. Dupont de Nemours & Co. under the trade name "NAFION" was cut into a rectangle having the dimensions 4.5"×5.0". The sample was then placed between two squares of plastic material having a 3.2"×3.2" open square on both sides. The sides of the open exposed area of solid polymer electrolyte membrane determines the catalytic area. (The use of masking techniques is optional.) One side of the solid polymer electrolyte membrane was sanded with 400 grit silicon carbide sand paper in the exposed 3.2"×3.2" area. The sanding was carried out completely across the exposed area in even strokes and then rotated 90° (right angles) and repeated to produce a crosshatched pattern. The solid polymer electrolyte was removed from the frame and weighed and replaced in the plastic masking frame.

The quantity of the catalyst needed was determined by the size of the area to be covered with catalyst and the desired loading of catalyst. The loading of catalyst is described in the following formula where L is the load of catalyst in milligrams per area: L mg/cm$^2$ ×cm$^2$=mg. An excess of catalyst (about three times) was used in order to cover effectively the area of the solid polymer electrolyte membrane. Excess catalyst was recollected in a dish.

The catalyst was shaken onto the exposed sanded area of the solid polymer electrolyte membrane and gently shaken and tapped (manually vibrated) within the area of the plastic masking frame which masks the outer edges of the membrane, until the entire exposed area of the membrane was covered evenly with the catalyst (approximately 1-2 minutes when carried out manually). The solid polymer electrolyte and caralyst were removed from the frame and reweighed to determine loading by the following formula: Weight gain (mg)÷cm$^2$ area=mg/cm$^2$.

The solid polymer electrolyte was placed catalyst side up between two sheets of titanium-palladium foil and placed in the center of a 204 inch$^2$ mold. The mold was placed in a hot press at 182°–188° C. (360°–370° F.) for about 8 minutes or until a thermocouple on the outside edge of the mold read 182° C. (360° F.). The force (pressure) used on the mold was 980 lbs/in$^2$. The press was cooled to approximately 43° C. (110° F.), and the solid polymer electrolyte membrane having the catalyst embedded in the surface of the membrane was removed.

Following the preparation of the electrode, that is, the solid polymer electrolyte membrane base member having at least one abraded surface and a finely-divided catalytic material fixed upon the abraded surface, the membrane was placed in de-ionized water for about 10 minutes and then brought to a boil. The membrane was allowed to boil for about 20 minutes and was gradually cooled to room temperature.

The solid polymer electrolyte membrane used in this example and in the following example was a cation polymer membrane wherein the polymer was hydrated copolymer after the foregoing boiling in de-ionized water. The membrane material was a copolymer of polytetrafuloroethylene (PTFE) and polysulfonyl fluoride vinyl ether containing pendant sulfonic (SO$_3$) acid groups. The cation exchange membrane (solid polymer electrolyte membrane) was received in the potassium (K+) form and was converted to the hydrogen (H+) form after the foregoing hydration step (boiling with water). In order to exchange or convert the cation exchange resin (solid polymer electrolyte) in the electrode to the hydrogen form, the electrode was placed in 1.5 normal sulfuric acid (H$_2$SO$_4$) for twenty minutes and rinsed well with de-ionized water. It was again placed in 1.5 normal sulfuric for another 20 minutes and rinsed with de-ionized water until a 3 ml sample gave negative results with two drops of 0.5 normal barium chloride (BaCl$_2$) solution. The membrane was placed in fresh de-ionized water and brought to a boil for 30 minutes and allowed to cool to room temperature.

A free formed decal of platinum black catalytic material (4 mg/cm$^2$) was applied to the other side of the membrane, that is the side opposite the solid polymer electrolyte base member having at least one abraded surface and finely-divided catalytic particles fixed thereon. Optionally, the catalyst can be deposited upon the roughened second surface of the solid polymer electrolyte membrane and fixed thereon by means of the description set forth above.

EXAMPLE 2

A dry solid polymer electrolyte membrane of the type described above, was placed in a plastic masking frame and sanded with the sand paper as described above in Example 1. 150 mgs of an iridium powdered alloy was shaken on the exposed area of the solid polymer electrolyte membrane. The excess iridium catalyst was tapped off the membrane, amd the loading of catalyst upon the surface of the membrane was determined as 0.25 mg/cm$^2$ (as determined by weighing the membrane before the loading and after the loading, i.e., the deposition of the iridium catalyst. The solid polymer electrolyte membrane having the finely-divided iridium catalyst powder deposited upon the abraded or sanded surface was pressed in a hot press at 182°–188° C. (360°–370° F.) at 980 lbs/in$^2$ for about 10 minutes, cooled and removed. The membrane was boiled in de-ionized water and was treated with sulfuric acid as described above to convert the ion exchange resin (solid polymer electrolyte) to the hydrogen form.

The electrode was completed by placing a current collector (platinized perforated titanium foil) over the side having the iridium catalyst fixed thereon and by placing a platinum-containing decal made in accordance with prior art techniques on the other side of the solid polymer electrolyte membrane. After the current collecting foil and the decal were aligned with the respective surfaces of the membrane, it was placed in the center of a mold and pressed in the hot press at 182°–188° C. (360°–370° F.) at 490 lbs/in$^2$ until an external thermocouple on the edge of the mold read 182° C. (360° F.). The press was then cooled to 43° C. (110° F.), and the completed electrode was removed and stored in water.

EXAMPLE 3

Electrolysis cells were constructed as substantially described in FIG. 2 of the drawing and the specification of U.S. Pat. No. 3,992,271. The cell is a gas generation apparatus in the form of an electrolysis cell. Briefly, in this cell, an oxygen chamber communicates with an oxygen outlet while a hydrogen chamber communicates with a hydrogen outlet. In operation, a direct current potential is applied across the anode and the cathode from a battery to produce oxygen and hydrogen at their respective electrodes. The hydrogen in the hydrogen chamber is removed through the hydrogen outlet while the oxygen in the oxygen chamber is removed through the oxygen outlet. A cation exchange membrane is employed between the electrodes, and hydrogen gas is produced at the cathode while oxygen gas is produced at the anode. The water required to produce hydrogen and oxygen by dissociation at the anode is applied to the anode by flooding the anode chamber or through the use of wicking. Except for the baseline cell, the electrodes used in these cells were made in accordance with the present invention as described in Example 2 above and comprise a solid polymer electrolyte membrane base member having an abraded surface and finely-divided catalytic particles fixed upon the abraded surface. Molded current collectors, a perforated foil anode support and carbon fiber paper cathode support were used. In the case of the baseline cell, decals of catalytic materials were used as the electrode material deposited upon the solid polymer electrolyte membrane.

The baseline cell used for comparison purposes had an iridium black electrode produced by the decal method as an anode, the loading of the catalyst thereon being 4.0 mg/cm$^2$. The performance of the baseline cell is shown in Table 1 below. The cell temperature was 82° C. (180° F.). The measurements were taken after an initial run plus 24 hours for the baseline cell. The measurements for the cell having a loading of 0.3 mg/cm$^2$ was taken at 452 hours; the measurements for the cell having an electrode catalytic loading of 0.7 mg/cm$^2$ was taken at 24 hours; and the measurement for the cell having a catalyst loading of 0.25 mg/cm$^2$ was taken at 162 hours. In all cases, the tests to show the performance of the electrodes made in accordance with the present invention in the gas generation cells utilized the low-loading catalytic anode made in accordance with the present invention.

TABLE 1

| CURRENT DENSITY *(ASF) | **CELL VOLTAGE (BASELINE CELL) Ir Black Anode 4 mg/cm$^2$ (No sanding) | CELL VOLTAGE Ir Black Anode 0.3 mg/cm$^2$ [1](Mechanical Stroke Sanding) | CELL VOLTAGE Ir Containing Anode 0.25 mg/cm$^2$ [1](Mechanical Stroke Sanding) | CELL VOLTAGE Ir Black Anode 0.7 mg/cm$^2$ [1](Mechanical Stroke Sanding) |
|---|---|---|---|---|
| 100 | 1.49 | 1.47 | 1.47 | 1.505 |
| 200 | 1.54 | 1.52 | 1.52 | 1.555 |
| 300 | 1.59 | 1.56 | 1.55 | 1.590 |
| 400 | 1.62 | 1.60 | 1.585 | 1.620 |
| 500 | 1.66 | 1.635 | 1.62 | 1.653 |
| 600 | 1.70 | 1.67 | 1.64 | 1.682 |
| 700 | 1.74 | 1.705 | 1.67 | 1.710 |
| 800 | 1.77 | 1.74 | 1.70 | 1.737 |
| 900 | 1.80 | 1.77 | 1.73 | 1.765 |
| 1000 | 1.83 | 1.802 | 1.76 | 1.783 |

*amps per square foot
**Volts D.C.
[1]Mechanical Stroke Sanding as described in Example 1 (90° manual strokes to form crosshatched pattern.)
[2]All cells had 4 mg/cm$^2$ platinum cathodes made by the decal method.

From the experimental data, it can be seen that electrodes (anode) made in accordance with the present invention and having substantially lower loadings of catalyst upon the anode, perform equal to or better than the higher loaded cells, such as those having 4.0 mg/cm² catalyst loading. Cell performance of the cell having 0.3 mg/cm² iridium catalyst at 452 hours was 1.802 volts D.C. at 1,000 amps/ft² in a cell operated at 82° C. (180° F.) and showed a 20 mV–40 mV improvement over the cell having an anode loading at 4.0 mg/cm². A cell having a catalyst loading of 0.25 mg/cm² iridium-containing catalyst as an anode at 162 hours had a voltage of 1.76 volts D.C. at 1,000 amps/ft² at 82° C. (180° F.) and showed 30 mV–50 mV improvement over the cell having a catalyst loading of 4.0 mg/cm².

EXAMPLE 4

A dry cation exchange membrane (solid polymer electrolyte membrane) supplied by E. I. DuPont de Nemours & Co., under the trademark called "NAFION 1200" and having dimensions of 2.5 ft² was sanded on an automatic sanding machine identified as a 710 Series Sueding Machine manufactured by Curtin-Hebert Co., Inc., Gloversville, N.Y., 12078. The sanding conditions were as follows:

| | |
|---|---|
| Type Drum Roll | Soft |
| Applied Force | 0.005 inch (0.0127 cm) |
| Sandpaper Grit | 220 silicon carbide |
| Rotational Speed | 1,200 RPM |
| Sanding Pattern | Crosshatched (two passes each horizontal and vertical direction) |
| Feed Rate | Minimum (6 yds. per minute) |

To this surface of solid polymer electrolyte roughened in a crosshatched pattern by automatic machine sanding, 1.4 mg/cm² iridium catalyst powder was deposited and fixed under the conditions set forth for pressure, temperature and cooling as described in Example 1. To the other side of the membrane, there was applied a platinum cathode having less than 2.2 mg/cm² platinum powder catalyst. The platinum powder was deposited and fixed in the same manner described in Example 1.

An electrolysis cell as described in Example 3 was used to study the performance of the electrodes of this example. The temperature of the water entering the cell was 81° C. (178° F.), and the temperature of the oxygen gas leaving the cell was 80° C. (176° F.). After 555 hours, the cell voltages were recorded at various current densities and are shown for various current densities in amps.ft² in Table 2 below.

TABLE 2

| CURRENT DENSITY (ASF) | CELL VOLTAGE Ir Anode (1.4 mg/cm²) Pt Cathode (2.0 mg/cm²) Machine Sanded |
|---|---|
| 100 | 1.47 |
| 200 | 1.525 |
| 300 | 1.56 |
| 400 | 1.595 |

TABLE 2-continued

| CURRENT DENSITY (ASF) | CELL VOLTAGE Ir Anode (1.4 mg/cm²) Pt Cathode (2.0 mg/cm²) Machine Sanded |
|---|---|
| 500 | 1.625 |
| 600 | 1.653 |
| 700 | 1.68 |
| 800 | 1.708 |
| 900 | 1.735 |
| 1000 | 1.76 |

Experimental data demonstrates improved results in cell voltage when compared with the cell voltages of the baseline cell shown in Table 1. Thus, in accordance with the present invention, it has been demonstrated that cell voltage of the low loaded electrodes made in accordance with the present invention are at least equal to or better than the cell voltages of electrodes having large loadings of catalyst made in accordance with prior art techniques.

Furthermore, in accordance with the present invention, it has been demonstrated that cells can be operational when using electrodes having very low loadings of catalyst thereon, and that there is no compromise in the structural integrity of the electrodes which have been roughened in accordance with the present invention. Cells using the electrodes made in accordance with the present invention have been operated for long hours with no demonstrated leaks or flow of water or other electrolytes through the membranes.

While other modifications of the invention and variations thereof which may be employed within the scope of the invention have not been described, the invention is intended to include such modifications as may be embraced within the following claims.

What is claimed is:

1. An electrode comprising a solid polymer electrolyte membrane base member having at least one abraded surface and finely-divided catalytic particles fixed upon the abraded surface.

2. The electrode of claim 1 wherein the surface is abraded in at least two directions.

3. The electrode of claims 1 or 2 wherein the abraded surface is crosshatched.

4. The electrode of claim 1 wherein the abraded surface is a grit blasted surface which has been subjected to grit blasting in at least two directions.

5. The electrode of claim 1 wherein the abraded surface is a sanded surface which has been subjected to frictional engagement with an abrasive in at least two directions.

6. The electrode of claim 1 wherein the catalytic particles are a metal.

7. The electrode of claim 1 wherein the catalytic particles are an oxide of a metal.

8. The electrode of claim 1 wherein the catalytic particles are a metal alloy.

9. The electrode of claim 1 wherein the catalytic particles are fixed upon the abraded surface by pressure.

10. The electrode of claim 1 wherein the catalytic particles are fixed upon the surface by heat.

11. The electrode of claim 1 wherein the catalytic particles are fixed upon the surface by pressure and heat.

* * * * *